(12) United States Patent
Ho et al.

(10) Patent No.: US 7,136,004 B2
(45) Date of Patent: Nov. 14, 2006

(54) IMAGE SIGNAL PROCESSING SYSTEM

(75) Inventors: Hung Hui Ho, Kaohsiung (TW); Wei Lun Weng, Pan Chiao (TW); Chia Hao Hsiung, Taipei (TW)

(73) Assignee: Realtek Semiconductor Corporation (TW)

( * ) Notice: Subject to any disclaimer, the term of this patent is extended or adjusted under 35 U.S.C. 154(b) by 0 days.

(21) Appl. No.: 11/184,995

(22) Filed: Jul. 20, 2005

(65) Prior Publication Data

US 2006/0017600 A1 Jan. 26, 2006

(30) Foreign Application Priority Data

Jul. 20, 2004 (TW) .............................. 093121640

(51) Int. Cl.
*H03M 1/12* (2006.01)

(52) U.S. Cl. ...................................... 341/155; 348/537

(58) Field of Classification Search ................ 348/537, 348/572, 536, 497, 521; 341/50, 155
See application file for complete search history.

(56) References Cited

U.S. PATENT DOCUMENTS

| 5,600,379 A | 2/1997 | Wagner |
| 5,784,120 A * | 7/1998 | Cummins et al. ........... 348/537 |
| 6,236,283 B1 * | 5/2001 | Koslov ....................... 332/103 |
| 6,778,621 B1 * | 8/2004 | Wilson et al. .............. 375/371 |

* cited by examiner

*Primary Examiner*—Brian Young

(57) ABSTRACT

An image signal processing system includes a buffer memory for storing a re-sampled digital data and a memory controller for receiving an used memory depth value and controlling the read speed of the buffer memory for the re-sampled digital data according to the used memory depth value, thereby solving the overflow or underflow problems of the memory.

21 Claims, 3 Drawing Sheets

IMAGE SIGNAL PROCESSING SYSTEM

CROSS REFERENCE TO RELATED APPLICATION

This application claims the priority benefit of Taiwan Patent Application Serial Number 093121640, filed on Jul. 20, 2004, the full disclosure of which is incorporated herein by reference.

BACKGROUND OF THE INVENTION

1. Field of the Invention

This invention generally relates to an image signal processing system, and more particularly, to time-base correction in an image signal processing system.

2. Description of the Related Art

As early as the 1950s, time-base correction of television signals in various forms has been widely applied in the field of video tape recording (VTR). Further, with the evolution of TV technology, the time-base correction techniques are still continuously utilized in various analog and digital TV systems. The time-base correction is generally utilized for reducing short-term and/or long-term timing variations in a TV signal.

In some specific applications, analog TV signal is digitized, e.g. by an analog-to-digital converter at a fixed sampling clock which is asynchronous with respect to the horizontal line frequency of the television signal. However, since time base errors in a TV signal may cause horizontal line periods to be different in length, the digitized TV signal sampled at the fixed sampling clock may thus contain different numbers of samples among various horizontal line periods.

In order to solve the above problem caused by the time-base errors, U.S. Pat. No. 5,600,379 discloses a television digital signal processing system, which is incorporated herein by reference. In the television digital signal processing system, a TV signal is digitally re-sampled by a digital re-sampler after a digital sampling process and then the re-sampled TV signal is stored into a FIFO (First-In First-Out) memory. The television digital signal processing system can control two phase-locked loops by a horizontal synchronization signal (Hsync), such that one of the phase-locked loops can control the sampling-rate-conversion ratio of the digital re-sampler and produce a reset signal for resetting the FIFO memory, and the other phase-locked loop can produce a clock for reading out the re-sampled samples from the FIFO memory.

However, in order to achieve the object, the FIFO memory of the above television digital signal processing system is required to have sufficient memory space, otherwise the FIFO memory may easily encounter an overflow or underflow situation while the re-sampled TV signal within a comparatively short period produces a large number of time-base errors; for example, while the reading process of a VTR is not smooth or the wireless environment for transmitting/receiving the TV signal is dramatically altered.

SUMMARY OF THE INVENTION

It is an object of the present invention to provide an image signal processing system for time-base correction so as to prevent a buffer memory from inducing overflow or underflow.

Embodiments according to the present invention discloses an image signal processing apparatus for processing an analog image signal, which comprises an analog-to-digital converter for converting the analog image signal into a first digital image data; a re-sampling unit for re-sampling the first digital image data and outputting a second digital image data; a buffer memory for writing and storing the second digital image data therein according to a first clock signal, and reading out the stored second digital image data therefrom according to a second clock signal; and a clock output circuit for generating the second clock signal according to an used memory depth of the buffer memory.

The embodiments according to the present invention also discloses a image signal processing method for processing an analog image signal, which comprises following steps: converting the analog image signal into a digital image data; re-sampling the digital image data; providing a buffer memory for storing the re-sampled digital image data, wherein the buffer memory writes the re-sampled digital image data thereto by a first clock signal, and reads out the re-sampled digital image data therefrom by a second clock signal; determining an used memory depth of the buffer memory; and controlling the clock rate of the second clock signal according to the used memory depth.

BRIEF DESCRIPTION OF THE DRAWINGS

Other objects, advantages, and novel features of the present invention will become more apparent from the following detailed description when taken in conjunction with the accompanying drawings.

DETAILED DESCRIPTION OF THE PREFERRED EMBODIMENT

Figure 1:
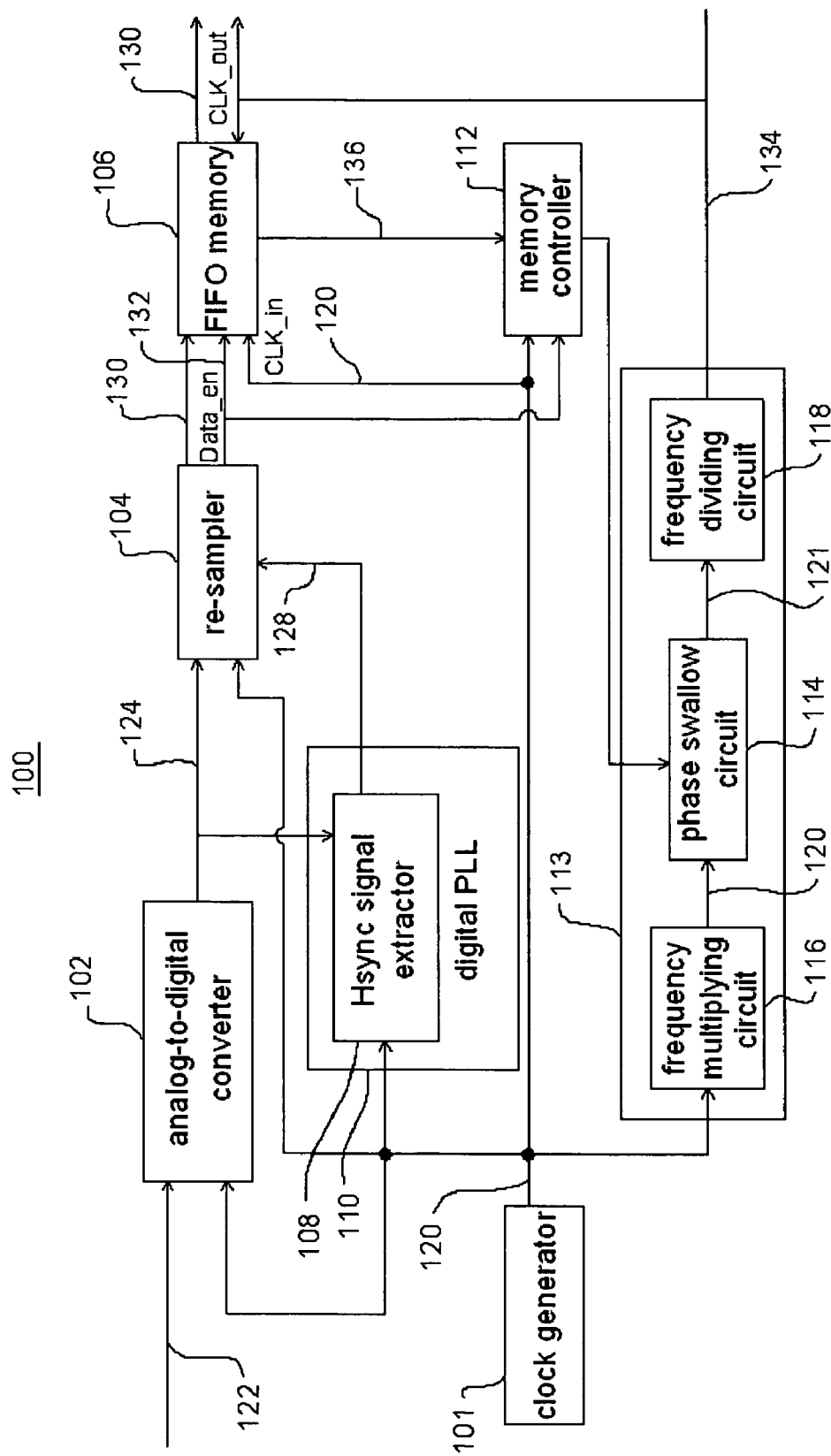
FIG. 1 is a circuit block diagram of an image signal processing system according to one embodiment of the present invention.

Please referring to FIG. 1, which shows a circuit block diagram of an image signal processing system (or device) 100 according to one embodiment of the present invention. The system 100 comprises a clock generator 101, a analog-to-digital converter (ADC) 102, a re-sampler 104, a FIFO (First-In First-Out) memory 106, a digital PLL (phase-locked loop) 110 having a horizontal synchronization (Hsync) signal extractor 108, a memory controller 112, and a clock output circuit 113 including a phase swallow circuit 114, a frequency multiplying circuit 116, and a frequency dividing circuit 118.

The clock generator 101 outputs a fixed clock signal 120 to the analog-to-digital converter 102, the re-sampler 104, the FIFO memory 106, the horizontal synchronization signal extractor 108, the digital PLL 110, the memory controller 112, and the clock output circuit 113. The FIFO memory 106 according to this embodiment can also be replaced by other buffer memory in various forms. In this embodiment, the horizontal synchronization signal extractor 108 extracts horizontal synchronization (Hsync) pulses from a digitized image data 124; then the digital PLL 110 can, according to the horizontal synchronization pulses, produce a control signal 128 for controlling the sampling-rate-conversion ratio of the re-sampler 104. The digital PLL 110 can be implemented according to the manner disclosed in U.S. Pat. No 5,600,379, and therefore is not described in details herein.

An analog image signal 122 is inputted into the analog-to-digital converter 102 and then converted into the digital image data 124 by the analog-to-digital converter 102 at the sampling rate of the clock signal 120. The horizontal synchronization signal extractor 108 receives the digital image data 124 and then extracts the horizontal synchronization (Hsync) pulses from the digital image data 124. The digital PLL 110 will, according to the horizontal synchronization pulses, output the control signal 128 for controlling the sampling-rate-conversion ratio of the re-sampler 104. The re-sampler 104 receives and re-samples the digital image data 124 and then outputs a re-sampled digital image data 130. The re-sampler 104 also outputs a data enable signal "Data_en" 132 to the FIFO memory 106 and the memory controller 112. When the data enable signal 132 is of a value of "1", the re-sampled digital image data 130 will be written into the FIFO memory 106 at the clock rate of the clock signal 120, which is also represented as "CLK_in". In addition, the stored re-sampled digital image data 130 will be read out from the FIFO memory at the clock rate of an output clock signal 134, which is also represented as "CLK_out", from the clock output circuit 113.

The FIFO memory 106 can also output a used memory depth value 136, wherein the used memory depth value represents the memory depth used, or stored with data, in the FIFO memory 106.

The memory controller 112 receives the used memory depth value 136 from the FIFO memory 106 and then can, according to the used memory depth value 136, decide the reading rate of the FIFO memory 106 for the re-sampled digital image data 130; that is, decide the clock rate of the output clock signal "CLK_out" 134 to control the reading rate of the FIFO memory 106. In this embodiment, the memory controller 112 can determine whether the clock rate of the output clock signal 134 is too fast or too slow according to the used memory depth value 136 received from the FIFO memory 106, based on a threshold value of halfway of the memory depth of the FIFO memory 106.

Figure 2:
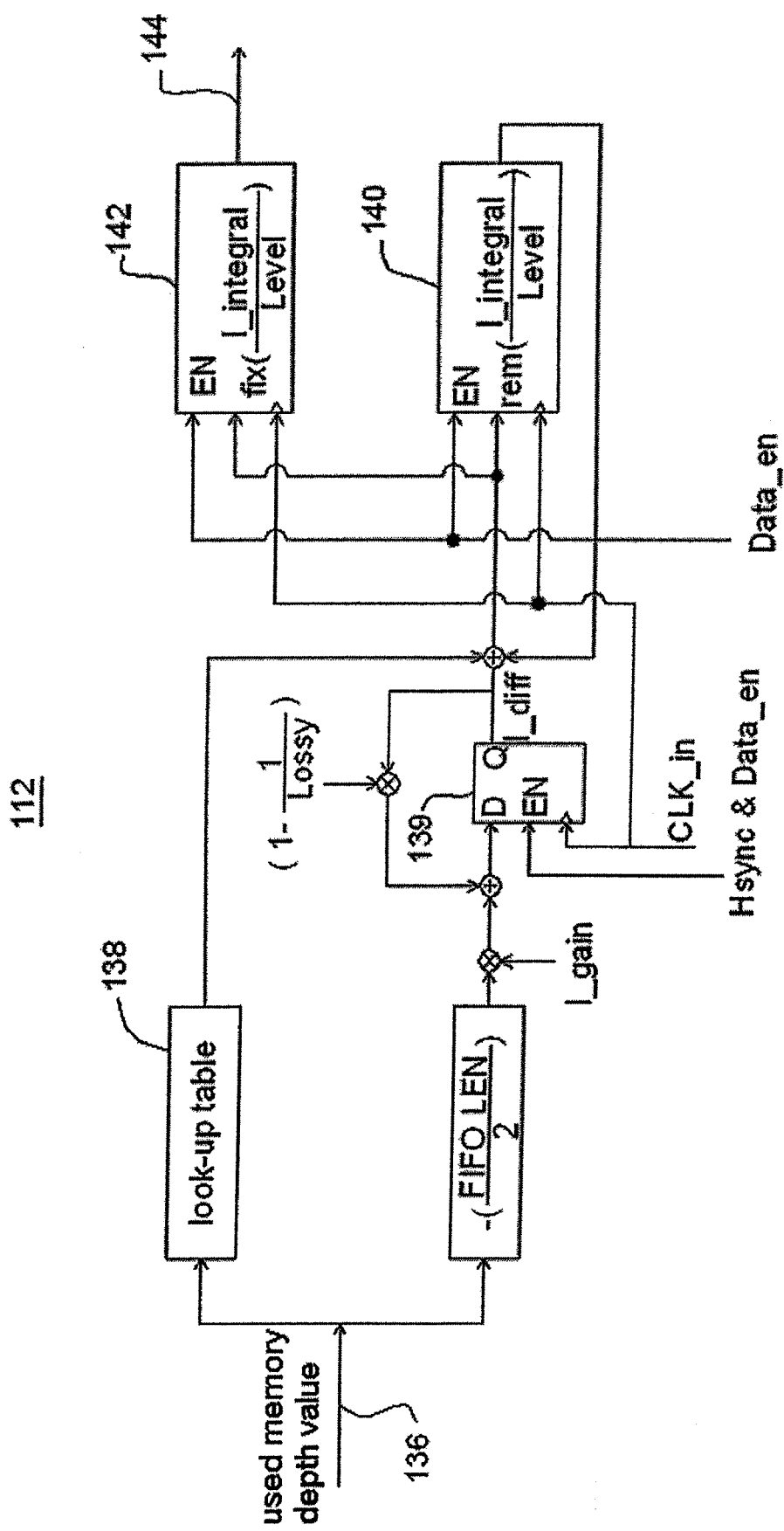
FIG. 2 is a detailed circuit block diagram of a memory controller according to one embodiment of the present invention.

FIG. 2 is a detailed circuit block diagram of a memory controller 112 according to one embodiment of the present invention. First, the difference between the used memory depth value 136 and the halfway depth "FIFO LEN/2" of the FIFO memory 116 is multiplied by a gain value "I_gain" so as to obtain a product. When the triggering edge of a resulting signal of an "AND" operation of the Hsync pulses and the data enable signal "Data_en" occurs, the product will be added to another product of a previously stored value "I_diff"0 and a value "1—1/Lossy" so as to obtain a sum, which is stored into a register 139 and becomes the currently updated "I_diff"; wherein "Lossy" represents an amount of past data used for reference. Such an operation is a typical proportional-integral (PI) operation used for introducing long-term trend information on top of referencing to present-time information.

Besides, the memory controller 112 also comprises a look-up table 138 for outputting a P value corresponding to the used memory depth value 136, and the P value is then summed together with the value I"_diff" and a remainder, so as to produce a value "I_integral". The P value is produced for preventing the burst input rate change, for example, a sudden increment of the used memory depth caused by VCR (video cassette recorder) head switch. Accordingly, in this embodiment, the corresponding P value is set to be very small (e.g. close to zero) when the used memory depth value 136 is close to half the memory depth, such that the above proportional-integral (PI) operation can dominate the resulting "I_integral" value. However, when the used memory depth value 136 deviates away from half the memory depth, which indicates occurrence of burst input rate change, a large P value is outputted such that the large P value can dominate the resulting "I_integral" value, so as to speed up the output clock rate change. Therefore, the system 100 can prevent the FIFO memory from inducing overflow or underflow by appropriately controlling the P value.

Then, a remainder "rem(I_integral/LEVEL)" obtained by dividing the value "I_integral" by a value "LEVEL" is stored into a register 140 and will be accumulated to the next "I_integral" value when the clock signal "CLK_in" and the data enable signal "Data_en" 132 occur. In addition, the quotient "fix(I_integral/LEVEL)" obtained by dividing the value "I_integral" by the value "LEVEL" is stored in another register 142 and will be outputted to the phase swallow circuit 114 of FIG. 1 through a transmitting path 144 when the clock signal "CLK_in" and the data enable signal "Data_en" 132 occur, such that the phase swallow circuit 114 can be controlled by the memory controller 112.

It should be noted that the memory controller 112 is not to be limited by the above embodiment. Other memory controllers including units/elements such as proportional-integral (PI) controllers, look-up tables, phase controllers and so on, or other circuit applications having the same function can also achieve the above object.

Further, in this embodiment, the clock output circuit 113 comprises the phase swallow circuit 114, the frequency multiplying circuit 116, and the frequency dividing circuit 118, which are all well known to those skilled in the art; and it can control the clock rate of the output clock "CLK_out" according to the output of the memory controller 112. The frequency multiplying circuit 116 multiplies the frequency of the clock signal 120 by n1 times and outputs the resultant clock signal 120 to the phase swallow circuit 114. The phase swallow circuit 114 processes the resultant clock signal 120 with phase swallowing operation according to the quotient, and outputs an adjusted clock signal 121 to the frequency dividing circuit 118. The frequency dividing circuit 118 divides the clock signal 121 by n2 times, and outputs the output clock signal 134 to the FIFO memory 106 so as to read the stored re-sampled digital image data 130 out from the memory 106. In other embodiments, the frequency multiplying circuit 116 and the frequency dividing circuit 118 can be removed, and the remaining system can still achieve the above object. Also, other clock controlling circuits can replace the clock output circuit 113 to achieve the above object.

In this embodiment, the capacity requirement of the memory 106 is related to the phase resolution of the phase swallow circuit 114, I_gain, Lossy, LEVEL and FIFO LEN. In practical application, the capacity of the memory 106 can be reduced to 32*20 bit or less.

Figure 3:
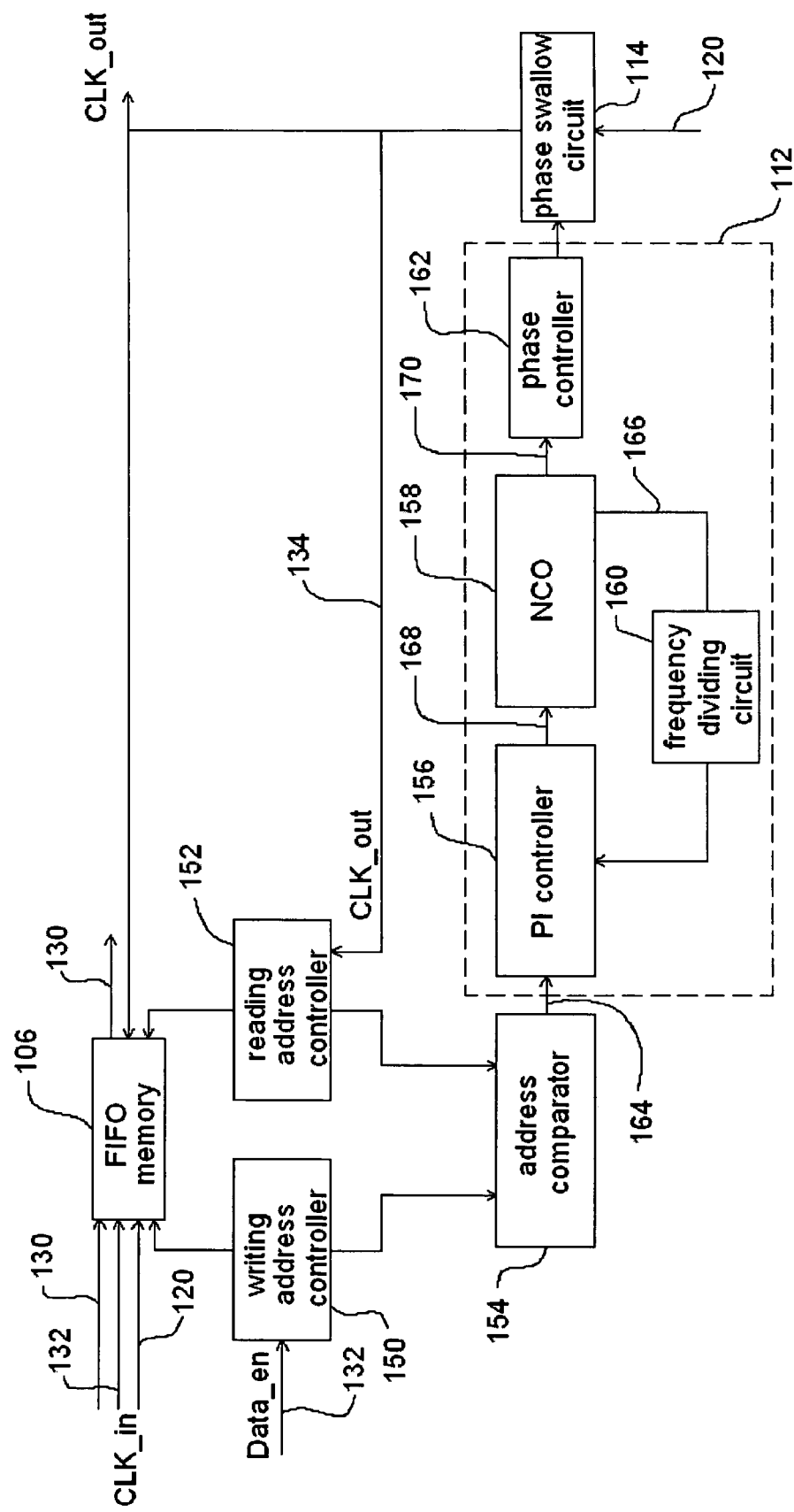
FIG. 3 is a circuit block diagram of a memory controller along with a FIFO memory according to another embodiment of the present invention.

FIG. 3 is a circuit block diagram of a memory controller 112 along with a FIFO memory 106 according to another embodiment of the present invention. In this embodiment, the image signal processing system further comprises a writing address controller 150, a reading address controller 152, and an address comparator 154. The writing address controller 150 can generate a writing address according to the data enable signal "Data_en" 132; the writing address will be added by 1, and transmitted to the FIFO memory 106 and the address comparator 154 when the data enable signal "Data_en" 132 occurs. The writing address indicates the address into which the digital image data 130 will be written within the FIFO memory 106. The reading address controller 152 can generate a reading address according to the clock signal "CLK_out" 134; the reading address will be added by 1, and transmitted to the FIFO memory 106 and the address comparator 154 when the clock signal "CLK_out" 134 occurs. The reading address indicates the address from which the digital image data 130 will be read out within the FIFO memory 106. The address comparator 154 compares the writing address value and the reading address value, and transmits the difference 164 between the two values to the memory controller 112. The difference 164 indicates the used memory depth of the FIFO memory 106.

The memory controller 112 shown in FIG. 3 comprises a proportional-integral (PI) controller 156, a numerical control oscillator (NCO) 158, a frequency dividing circuit 160, and a phase controller 162. The PI controller 156 of the memory controller 112 receives the difference 164. The NCO 158 can output a clock signal 166 to the frequency dividing circuit 160, and then the clock signal 166 is fed back to the PI controller 156 through the frequency dividing circuit 160. The PI controller 156 controls the clock rate of clock signal "CLK_out" and can change the clock rate by adjusting a K1 and a K2 parameter. The PI controller 156 outputs a resultant signal 168 to the NCO 158. The NCO 158 simulates the phase and frequency of the external output clock signal and then transmits the simulated values 170 to the phase controller 162, such that the phase controller 162 can control the amount of phase number increment or decrement of the clock signal 120 in the phase swallow circuit 114. Finally, the phase swallow circuit 114 outputs the output clock signal "CLK_out" 134 to the FIFO memory 106 and the reading address controller 152 so as to read the re-sampled digital image data 130 out from the FIFO memory 106.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. An image signal processing apparatus for processing an analog image signal, the image signal processing apparatus comprising:
    an analog-to-digital converter for converting the analog image signal into a first digital image data;
    a re-sampling unit for re-sampling the first digital image data and outputting a second digital image data;
    a buffer memory for writing and storing therein the second digital image data according to a first clock signal, and reading out the stored second digital image data therefrom according to a second clock signal; and
    a clock output circuit for generating the second clock signal according to an used memory depth of the buffer memory by incorporating a P value, wherein the P value is set to be zero or close to zero when the used memory depth is about half the memory depth of the buffer memory, and the P value is set to be dominant when the used memory depth deviates from half the memory depth of the buffer memory.

2. The image signal processing apparatus as claimed in claim 1, further comprising:
    a memory controller for receiving the used memory depth from the buffer memory and outputting a corresponding control signal corresponding to the used memory depth to the clock output circuit.

3. The image signal processing apparatus as claimed in claim 2, wherein the memory controller further comprises:
    a subtractor for subtracting the used memory depth from a predetermined depth of the buffer memory and outputting a difference;
    a first multiplexer for multiplying the difference by a gain value and outputting a first product;
    a first adder for adding the first product to a first value and outputting a first sum;
    a first register for storing the first sum and outputting the first sum by to the first clock signal;
    a second adder for receiving the first sum from the first register, adding the first sum to a second value and outputting a second sum;
    a second register for storing a remainder obtained by dividing the second sum by a third value, and the remainder added to the second sum through the second adder; and
    a third register for storing a quotient obtained by dividing the second sum by the third value and outputting the corresponding control signal, wherein the corresponding control signal is in relation to the quotient.

4. The image signal processing apparatus as claimed in claim 3, wherein the memory controller further comprises:
    a look-up table for outputting a fourth value corresponding to the used memory depth, wherein the fourth value is added to the second sum through the second adder.

5. The image signal processing apparatus as claimed in claim 2, wherein the memory controller further comprises:
    a proportional-integral (PI) controller for receiving the used memory depth and outputting a result signal;
    a numerical control oscillator (NCO) for receiving the result signal and outputting a numeral signal; and
    a phase controller for receiving the numeral signal and outputting the corresponding control signal.

6. The image signal processing apparatus as claimed in claim 1, wherein the buffer memory is a First-In First-Out (FIFO) memory.

7. The image signal processing apparatus as claimed in claim 1, wherein the clock output circuit comprises a phase swallow circuit for adjusting the clock rate of the second clock signal according to the used memory depth of the buffer memory.

8. The image signal processing apparatus as claimed in claim 7, wherein the clock output circuit further comprises a frequency multiplying circuit and a frequency dividing circuit, respectively coupled to the phase swallow circuit.

9. The image signal processing apparatus as claimed in claim 1, further comprising a memory depth extractor for extracting the used memory depth of the buffer memory.

10. The image signal processing apparatus as claimed in claim 9, wherein the memory depth extractor comprises:
    a writing address controller for recording a writing address, wherein the writing address indicates the address into which the second digital image data is written within the buffer memory;
    a reading address controller for recording a reading address, wherein the reading address indicates the address from which the second digital image data is read out within the buffer memory; and
    an address comparator for receiving the writing address and the reading address, and outputting a difference between the writing address and the reading address, wherein the difference indicates the used memory depth.

11. The image signal processing apparatus as claimed in claim 1, wherein the P value is generated by a look-up table.

12. An image signal processing apparatus for processing an analog image signal, the image signal processing apparatus comprising:
- an analog-to-digital converter for converting the analog image signal into a first digital image data;
- a re-sampling unit for re-sampling the first digital image data and outputting a second digital image data;
- a buffer memory for writing and storing therein the second digital image data according to a first clock signal, and reading out the stored second digital image data therefrom according to a second clock signal; and
- a clock output circuit for generating the second clock signal according to an used memory depth of the buffer memory, wherein the clock output circuit comprises a phase swallow circuit for adjusting the clock rate of the second clock signal according to the used memory depth of the buffer memory.

13. The image signal processing apparatus as claimed in claim 12, further comprising:
- a memory controller for receiving the used memory depth from the buffer memory and outputting a corresponding control signal corresponding to the used memory depth to the clock output circuit, the memory controller comprising:
- a proportional-integral (PI) controller for receiving the used memory depth and outputting a result signal;
- a numerical control oscillator (NCO) for receiving the result signal and outputting a numeral signal; and
- a phase controller for receiving the numeral signal and outputting the corresponding control signal.

14. The image signal processing apparatus as claimed in claim 12, wherein the clock output circuit further comprises a frequency multiplying circuit and a frequency dividing circuit, respectively coupled to the phase swallow circuit.

15. The image signal processing apparatus as claimed in claim 12, further comprising:
- a memory controller for receiving the used memory depth from the buffer memory and outputting a corresponding control signal corresponding to the used memory depth to the clock output circuit, the memory controller comprising: a subtractor for subtracting the used memory depth from a predetermined depth of the buffer memory and outputting a difference;
- a first multiplexer for multiplying the difference by a gain value and outputting a first product;
- a first adder for adding the first product to a first value and outputting a first sum;
- a first register for storing the first sum and outputting the first sum by to the first clock signal;
- a second adder for receiving the first sum from the first register, adding the first sum to a second value and outputting a second sum;
- a second register for storing a remainder obtained by dividing the second sum by a third value, and the remainder added to the second sum through the second adder; and
- a third register for storing a quotient obtained by dividing the second sum by the third value and outputting the corresponding control signal, wherein the corresponding control signal is in relation to the quotient.

16. The image signal processing apparatus as claimed in claim 15, wherein the memory controller further comprising:
- a look-up table for outputting a fourth value corresponding to the used memory depth, wherein the fourth value is added to the second sum through the second adder.

17. An image signal processing apparatus for processing an analog image signal, the image signal processing apparatus comprising:
- an analog-to-digital converter for converting the analog image signal into a first digital image data;
- a re-sampling unit for re-sampling the first digital image data and outputting a second digital image data;
- a buffer memory for writing and storing therein the second digital image data according to a first clock signal, and reading out the stored second digital image data therefrom according to a second clock signal;
- a clock output circuit for generating the second clock signal according to an used memory depth of the buffer memory; and
- a memory depth extractor for extracting the used memory depth of the buffer memory, wherein the memory depth extractor comprises:
  - a writing address controller for recording a writing address, wherein the writing address indicates the address into which the second digital image data is written within the buffer memory;
  - a reading address controller for recording a reading address, wherein the reading address indicates the address from which the second digital image data is read out within the buffer memory; and
  - an address comparator for receiving the writing address and the reading address, and outputting a difference between the writing address and the reading address, wherein the difference indicates the used memory depth.

18. The image signal processing apparatus as claimed in claim 17, wherein the clock output circuit further comprises a phase swallow circuit for adjusting the clock rate of the second clock signal according to the used memory depth of the buffer memory.

19. An image signal processing method for processing an analog image signal, the method comprising following steps:
- converting the analog image signal into a digital image data;
- re-sampling the digital image data;
- providing a buffer memory for storing the re-sampled digital image data, wherein the buffer memory writes the re-sampled digital image data thereto by a first clock signal, and reads out the re-sampled digital image data therefrom by a second clock signal;
- determining an used memory depth of the buffer memory; and
- controlling the clock rate of the second clock signal according to the used memory depth, wherein the step of controlling the clock rate of the second clock signal further comprises performing a table look up operation according to the used memory depth.

20. The image signal processing method as claimed in claim 19, wherein the step of controlling the clock rate of the second clock signal further comprises performing a phase swallow operation on a fixed clock signal according to the used memory depth.

21. The image signal processing method as claimed in claim 19, wherein the step of controlling the clock rate of the second clock signal further comprises performing a proportional-integral (PI) operation according to the used memory depth.

* * * * *